US008522773B2

(12) United States Patent
Meyer

(10) Patent No.: US 8,522,773 B2
(45) Date of Patent: Sep. 3, 2013

(54) SOLAR TRACKING

(75) Inventor: Steven M. Meyer, Georgetown, TX (US)

(73) Assignee: Texas Instruments Austin Incorporated, Austin, TX (US)

(*) Notice: Subject to any disclaimer, the term of this patent is extended or adjusted under 35 U.S.C. 154(b) by 320 days.

(21) Appl. No.: 12/613,853

(22) Filed: Nov. 6, 2009

(65) Prior Publication Data
US 2010/0282243 A1 Nov. 11, 2010

Related U.S. Application Data

(60) Provisional application No. 61/112,738, filed on Nov. 8, 2008.

(51) Int. Cl.
F24J 2/40 (2006.01)

(52) U.S. Cl.
USPC ........... 126/601; 126/600; 126/602; 126/603; 136/245; 136/246; 248/455; 248/371

(58) Field of Classification Search
USPC ................ 126/600, 601, 602, 603, 604, 605, 126/574; 136/245, 246; 248/455, 371
See application file for complete search history.

(56) References Cited

U.S. PATENT DOCUMENTS

| 4,129,360 | A | * | 12/1978 | Deflandre et al. | 359/853 |
| 4,145,021 | A | * | 3/1979 | Gaechter et al. | 248/371 |
| 4,172,739 | A | * | 10/1979 | Tassen | 136/246 |
| 5,022,929 | A | * | 6/1991 | Gallois-Montbrun | 136/246 |
| 5,632,823 | A | * | 5/1997 | Sharan | 136/246 |
| 2009/0165841 | A1 | * | 7/2009 | Gunn et al. | 136/245 |

* cited by examiner

Primary Examiner — Avinash Savani
(74) Attorney, Agent, or Firm — Robert D. Marshall, Jr.; Wade James Brady, III; Frederick J. Telecky, Jr.

(57) ABSTRACT

The disclosed invention is a solar tracker that is a simple 2 axis system that can be powered with integrated stepping motors and lead screw actuators that provides the necessary structural support and 2 degrees of freedom in the motion of the solar collector, to increase the electrical output of the system. Since the solution is designed for use with only one solar panel the mechanical forces such as wind load are much lower and easier to manage. The disclosed invention is also a solar tracker that is a single axis version where the base is fixed and the elevation is set at an average value for the location and pivoting mechanism operates the azimuth axis. Since the dominant energy improvement comes from tracking the azimuth, this would be a likely solution where a lower cost or less complex system is desired.

3 Claims, 2 Drawing Sheets

SOLAR TRACKING

CLAIM OF PRIORITY

This application claims priority under 35 U.S.C. 119(e)(1) to U.S. Provisional Application No. 61/112,738 filed Nov. 8, 2008.

TECHNICAL FIELD OF THE INVENTION

The technical field of this invention is solar tracking and more specifically solar tracking for a single solar panel.

BACKGROUND OF THE INVENTION

Conversion of light from the sun into electricity depends on the orientation of the solar panel to sun. By following the sun's daily change of azimuth and annual variations in elevation as a result of the location with respect to the Earth's curvature, the total output of the solar panel can be increased substantially. Some solar trackers report greater than 40% increase in total power output.

Implementing a solar tracker for a single solar panel is not popular because they are not cost effective. Existing tracking systems are designed for groups of solar panels typically from 10 to 20 at a time. This makes the cost of the system more acceptable. While solar tracker systems are readily available, they are usually designed on a steel pipe mast and must be mounted on a poured concrete block on the ground. These systems are typically not suited to integration with a residential roof.

SUMMARY OF THE INVENTION

This invention is a solar tracker with a simple two axis system operated with integrated stepping motors and lead screw actuators that provides the necessary structural support and two degrees of freedom in the motion of the solar collector, to increase the electrical output of the system. Because this invention is designed for use with only one solar panel, the mechanical forces such as wind load are much lower than seen in systems for groups of solar panels and easier to manage. The invention may also be practiced in a single axis version where the base is fixed and the elevation is set at an average value for the location and the pivoting mechanism operates the azimuth axis. Since the dominant energy improvement using solar tracking comes from tracking the azimuth, such a single axis systems provides a lower cost and less complexity than two axis systems.

BRIEF DESCRIPTION OF THE DRAWINGS

These and other aspects of this invention are illustrated in the drawings, in which.

DETAILED DESCRIPTION OF PREFERRED EMBODIMENTS

This invention is a method and apparatus for solar tracking. This application describes numerous specific details in order to provide a thorough understanding of the present invention. One skilled in the art will appreciate that one may practice the present invention without these specific details. Additionally, this disclosure does not describe some well known items in detail to not obscure the present invention.

The invention is a simple 2 axis solar panel tracking system. This solar panel tracking system is operated using integrated stepping motors and lead screw actuators. These components provide structural support and two degrees of freedom in the motion of the solar panel. This solar panel tracking increases the electrical output of the system. This invention is designed for use with only one solar panel. Therefore the mechanical forces such as wind load are much lower and easier to manage than prior art tracking systems which control groups of solar panels.

An alternative embodiment includes a single axis where the base is fixed and the elevation is set at an average value for the location. In this alternative embodiment a pivoting mechanism operates the azimuth axis. Since the dominant energy improvement comes from tracking azimuth, this alternative embodiment would be useful where a lower cost or less complex system is desired.

Figure 1:
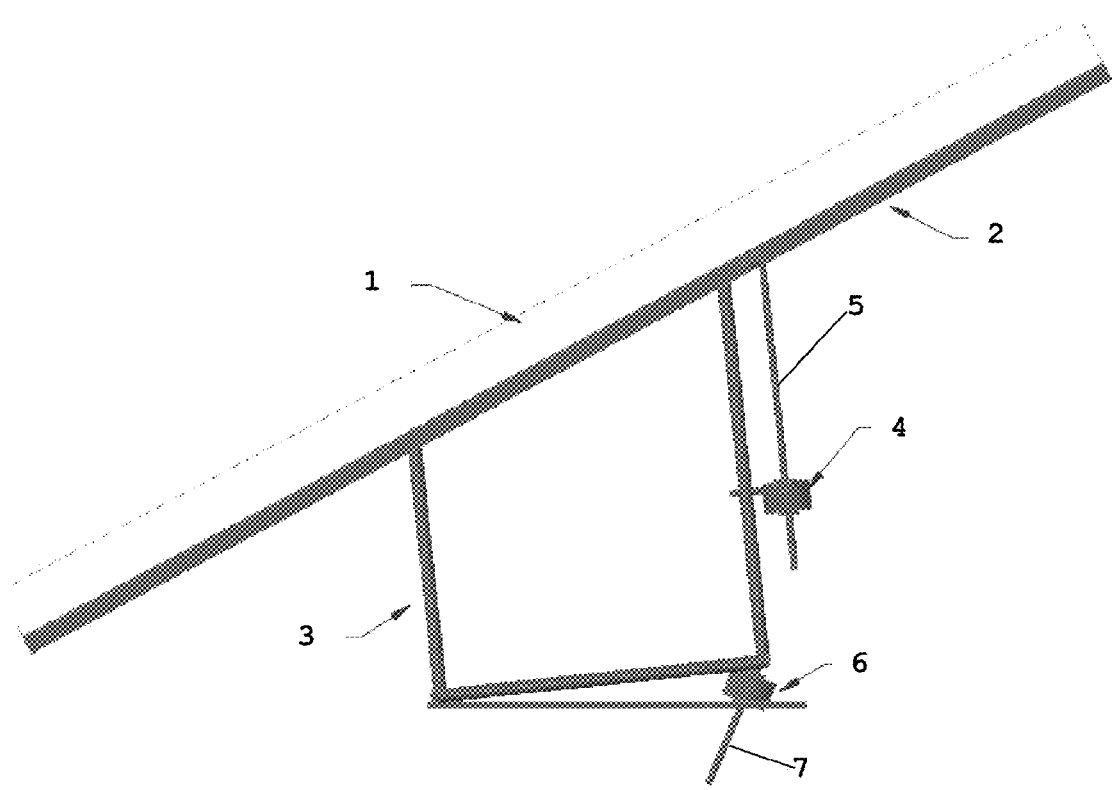
FIG. 1 is a side view of the invention.
Figure 2:
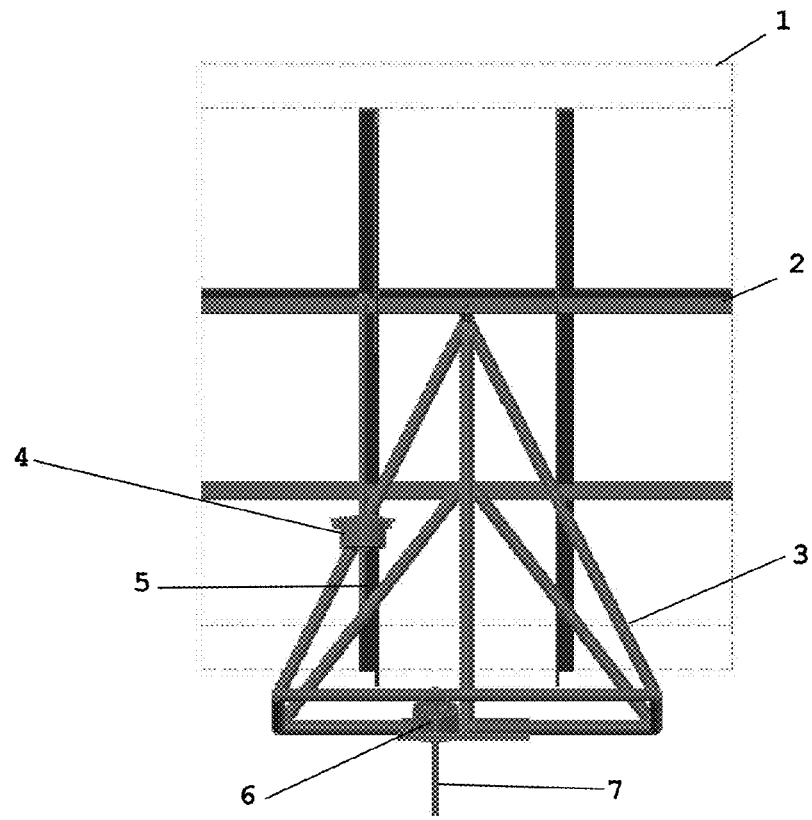
FIG. 2 is a rear view of the invention.

FIG. 1 is a side view of the invention. FIG. 2 is a rear view of the invention. Solar panel 1 is mounted to sub frame 2 to provide a means of attachment and support to the actuation system. Stepping motor 4 having a concentric lead screw 5 is mounted to base frame 3 on a pivoting bracket and terminates on a sub frame 2. Sub frame 2 is attached to base frame 3 by two pivot shafts at the midline. This arrangement permits simple motion of solar panel 1 in azimuth.

Base frame 3 is mounted to a plate with simple hinge type bearings at one end and a second stepping motor 6 and concentric lead screw 7 to allow elevation of the assembly. Base frame 3 should be designed taking into account the maximum winter solar angle of elevation to reduce the total range of motion required for seasonal adjustment. The known combination of integrated lead screw and stepping motor can easily achieve 0.001" accuracy. Thus this arrangement enables precise control of the azimuth and elevation.

The second embodiment of the invention eliminates stepper motor 6 and lead screw 7. Sub frame 2 is mounted on base frame 5 at a fixed elevation. This fixed elevation is selected having an angle corresponding to the average solar elevation at the location of the installation. Because azimuth solar tracking provides most of the benefit of solar tracking, this single axis embodiment provides substantial benefit at reduced cost.

Figure 3:
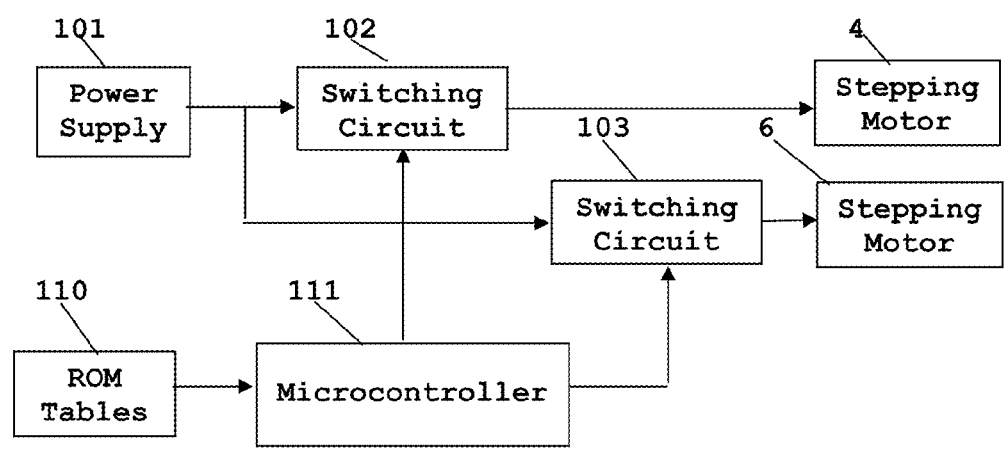
FIG. 3 is a block diagram of the control circuit for the stepper motors.

FIG. 3 is a circuit diagram of the control circuit for stepper motors 4 and 6. Power supply 101 supplies electric power to switching circuits 102 and 103. Switching circuit 102 supplies switched power to stepping motor 4. Switching circuit 103 supplies switched power to stepping motor 6. Microcontroller 111 controls the switching of both switching circuits 102 and 103. Microcontroller 111 consults data stored in ROM tables 110 regarding the solar azimuth and elevation for the current time. Microcontroller 111 causes switching circuits 102 to supply electric power to stepping motor 4 and switching circuits 103 to supply electric power to stepping motor 6 to control the orientation of solar panel 1. For the alternate embodiment having only one axis, the circuit of FIG. 3 is modified to eliminate switching circuit 103 and stepping motor 6.

Other embodiments of the present invention will be apparent to those skilled in the art after considering this disclosure or practicing the disclosed invention. The specification and examples above are exemplary only, with the true scope of the present invention being determined by the following claims.

What is claimed is:

1. A solar tracker for a solar panel, comprising:
a subframe having a solar panel mounted thereon;

a base frame having said subframe mounted thereon, said subframe having a limited range of motion in elevation relative to said base frame corresponding to a maximum winter solar angle for an installation location;

a first stepping motor, a corresponding first lead screw mounted between said subframe and said base frame disposed for movement of said subframe in azimuth relative to said base frame;

a second stepping motor, a corresponding second lead screw mounted between said subframe and said base frame disposed for movement of said subframe in elevation relative to said base frame; and wherein said mounting of said subframe on said base frame, said second stepping motor and said corresponding second lead screw reduces the total range of motion required for seasonal adjustment.

2. A solar tracker for a solar panel, comprising:

a subframe having a solar panel mounted thereon;

a base frame;

a first stepping motor, a corresponding first lead screw mounted between said subframe and said base frame disposed for movement of said subframe in azimuth relative to said base frame;

a second stepping motor, a corresponding second lead screw mounted between said subframe and said base frame disposed for movement of said subframe in elevation relative to said base frame;

a read only memory (ROM) storing data tables regarding solar azimuth and elevation verses time for an installation location; and a electronic controller connected to said first stepping motor, said second stepping motor and said read only memory, said electronic controller consulting said data tables stored in said read only memory and controlling said first stepping motor and said second stepping motor to cause said solar panel to orient to solar azimuth and elevation according to a current time to thereby track daily sun movement.

3. A solar tracker for a solar panel, comprising:

a subframe having a solar panel mounted thereon;

a base frame, said subframe mounted on said base frame at a fixed elevation corresponding to an average solar elevation for an installation location; and a stepping motor, a corresponding lead screw and a first tie rod mounted between said subframe and said base frame disposed for movement of said subframe in azimuth relative to said base frame;

a read only memory (ROM) storing data tables regarding solar azimuth verses time for an installation location; and a electronic controller connected to said stepping motor, said electronic controller consulting said data tables stored in said read only memory and controlling said stepping motor to cause said solar panel to orient to solar azimuth according to a current time to thereby track daily solar movement.

* * * * *